United States Patent [19]
Hassan et al.

[11] Patent Number: 5,796,726
[45] Date of Patent: Aug. 18, 1998

[54] SYSTEMS AND METHODS FOR RANDOM ACCESS IN TIME DIVISION MULTIPLE ACCESS SATELLITE RADIOTELEPHONE COMMUNICATIONS

[75] Inventors: Amer Hassan; Rajaram Ramesh; Stanley L. Reinhold, all of Cary; Larry W. Massengill, Selma; Yi-Pin Eric Wang, Raleigh, all of N.C.

[73] Assignee: Ericsson Inc., Research Triangle Park, N.C.

[21] Appl. No.: 629,358

[22] Filed: Apr. 8, 1996

[51] Int. Cl.$^6$ .............................. H04B 7/185; H04T 4/00
[52] U.S. Cl. .................... 370/322; 370/344; 370/324; 370/350; 455/427; 455/12.1; 455/450
[58] Field of Search ........................ 370/329, 330, 370/310, 316, 319, 321, 322, 324, 326, 328, 344, 345, 347, 350; 455/12.1, 34.1, 34.2, 450, 427, 422, 426, 451, 452, 500, 509–511, 507, 517

[56] References Cited

U.S. PATENT DOCUMENTS

| | | | |
|---|---|---|---|
| 3,818,453 | 6/1974 | Schmidt et al. | 370/324 |
| 4,555,782 | 11/1985 | Alaria et al. | 370/324 |

(List continued on next page.)

FOREIGN PATENT DOCUMENTS

| | | |
|---|---|---|
| 0 026 603 A1 | 4/1981 | European Pat. Off. . |
| 0 097 309 A2 | 1/1984 | European Pat. Off. . |

(List continued on next page.)

OTHER PUBLICATIONS

PCT International Search Report, PC/US97/05604, Oct. 2, 1997.

Jabbari et al., "*Performance of Demand Assignment TDMA and Multicarrier TDMA Satellite Networks*", IEEE Journal on Selected Areas in Communication, Feb. 1992, No. 2, pp. 478–486.

Power et al., "*Demand Assignment Multiple Access and Dynamic Channel Allocation Strategies for Integrating Radio Dispatch and Telephone Services Over Mobile Satellite Systems*", IEEE Journal on Selected Areas in Communications, Aug. 1992, No. 6, pp. 1021–1029.

(List continued on next page.)

*Primary Examiner*—Benedict V. Safourek
*Assistant Examiner*—Seema S. Rao
*Attorney, Agent, or Firm*—Myers Bigel Sibley & Sajovec

[57] ABSTRACT

In a time division multiple access (TDMA) satellite radiotelephone communications system, a radiotelephone communicates random access channel radiotelephone communications signals to a satellite over a dedicated random access channel uplink carrier frequency band. In response, a time division multiple access channel on a time division multiplexed uplink carrier frequency band different from the dedicated random access channel uplink carrier frequency band is assigned. The radiotelephone communicates time division multiplexed radiotelephone communications signals to the satellite over the allocated time division multiple access channel. Random access channel radiotelephone communications signals may be communicated to the satellite from a first radiotelephone over a first dedicated random access channel uplink carrier frequency band or from a second radiotelephone over a second dedicated random access channel uplink carrier frequency band different from said first dedicated random access channel uplink carrier frequency band. For a system in which the satellite communicates radiotelephone communications signals to radiotelephones located in a first coverage area and communicates radiotelephone communications signals to radiotelephones located in a second coverage area, random access channel radiotelephone communications signals may be communicated over a first dedicated random access uplink carrier frequency band if the radiotelephone is located in the first coverage area or communicating random access radiotelephone communications signals over a second dedicated random access channel uplink carrier frequency band different from the first dedicated random access uplink carrier band if the radiotelephone is located in the second coverage area.

17 Claims, 12 Drawing Sheets

U.S. PATENT DOCUMENTS

| | | | |
|---|---|---|---|
| 5,172,375 | 12/1992 | Kou | 370/322 |
| 5,216,427 | 6/1993 | Yan et al. | 370/324 |
| 5,239,677 | 8/1993 | Jasinki | 370/313 |
| 5,249,174 | 9/1993 | Itoh | 370/330 |
| 5,381,443 | 1/1995 | Borth et al. | 370/329 |
| 5,420,864 | 5/1995 | Dahlin et al. | 370/347 |
| 5,471,473 | 11/1995 | Tejima | 370/329 |
| 5,485,464 | 1/1996 | Strodtbeck et al. | 370/319 |
| 5,539,730 | 7/1996 | Dent | 370/330 |
| 5,566,168 | 10/1996 | Dent | 370/323 |
| 5,577,024 | 11/1996 | Malkamaki et al. | 370/335 |
| 5,642,354 | 6/1997 | Spear | 370/329 |

FOREIGN PATENT DOCUMENTS

| | | |
|---|---|---|
| 0 097 309 B1 | 11/1987 | European Pat. Off. . |
| 0 404 173 A2 | 12/1990 | European Pat. Off. . |
| 0 553 952 A1 | 8/1993 | European Pat. Off. . |
| 0 685 014 A1 | 6/1995 | European Pat. Off. . |

OTHER PUBLICATIONS

M. Mouly and M.B. Pautet, *The GSM System For Mobile Communications*, Radio Resource Management, 1992, pp. 368–372.

Carlo Caini et al., *A Spectrum– and Power–Efficient EHF Mobile Satellite System to be Integrated with Terrestial Cellular Systems*, IEEE Journal On Selected Areas In Communications, vol. 10, No. 8, Oct. 1992, pp. 1315–1325.

M. Kawai et al., *Randam TDMA Access Protocol with Application to Multi Beam Satellites*, IEEE International Conference on Communications, Conference Record vol. 3 of 3, ICC'82 The Digital Revolution, ISSN 0536–1486, IEEE Catalog Number 82CH1766–5, Jun. 13–17, 1982, pp. 7F.3.1–7F.3.5.

Giuliano Benelli et al., *Integration of Random Access and TDMA Techniques in a Multibeam Satellite System*, IEEE Global Telecommunications Conference, Conference Record vol. 2 of 3, "Communications In The Information Age", IEEE #84CH2064–4, LC84–81785, Nov. 26–29, 1984, pp. 28.7.1–28.7.4.

SYSTEMS AND METHODS FOR RANDOM ACCESS IN TIME DIVISION MULTIPLE ACCESS SATELLITE RADIOTELEPHONE COMMUNICATIONS

FIELD OF THE INVENTION

The present invention relates to communications systems and methods, in particular, to satellite radiotelephone communications systems and methods.

BACKGROUND OF THE INVENTION

Satellite radiotelephone systems are used throughout the world to provide dependable, high quality communications. Satellite radiotelephone systems are increasingly being developed for areas where population is sparsely distributed over large areas or where rugged topography tends to make conventional landline telephone or cellular telephone infrastructure technically or economically impractical. In addition, satellite radiotelephone systems are also being installed in developing nations which do not have an existing communications infrastructure and for which installation of a conventional landline telephone or cellular radiotelephone system would be economically impractical.

As shown in FIG. 1, a satellite radiotelephone system 100 typically includes one or more satellites 110, which may serve as relays or transponders between a central earth station 130 and radiotelephones 120. The earth station may in turn be connected to a public switched telephone network 140, allowing communications between satellite radiotelephones, and communications between satellite radio telephones and conventional terrestrial cellular radiotelephones or landline telephones. The satellite radiotelephone system may utilize a single antenna beam covering the entire area served by the system, or, as shown in FIG. 1, the satellite may be designed such that it produces multiple minimally-overlapping beams 150, each serving distinct geographical coverage areas 160 in the system's service region. Thus, a cellular architecture similar to that used in conventional terrestrial cellular radiotelephone systems can be implemented in a satellite-based system. The satellite 110 typically communicates with a radiotelephone 120 over a bidirectional communications pathway, with radiotelephone communications signals being communicated from the satellite 110 to the radiotelephone 120 over a downlink 170, and from the radiotelephone 120 to the satellite 110 over an uplink 180.

As illustrated in FIG. 2, in order to provide "duplex", i.e., two-way, communications, separate sets of carrier frequency bands 210, 220 in a carrier frequency spectrum 200 typically are allocated for downlinks and uplinks. Design considerations such as transmitter peak power capability, receiver capabilities and other features of the satellites and the radiotelephones may make it preferable for these bands to be asymmetrically distributed. For example, in the ACeS (Association of Southeast Asian Nations Cellular Satellite), satellite radiotelephone communications system produced by the assignee of the present application, Ericsson Telecom, AB, Stockholm, Sweden, downlinks are designed to use a set of carrier frequency bands having 200 KHz bandwidth, but uplink carrier frequency bands are designed with a 50 KHz bandwidth, in part because of the power limitations of the radiotelephones used in the system.

However, because duplex communications are typically desired in a radiotelephone system, approximately the same uplink and downlink information capacity is often desirable. For this reason, the downlink and uplink frequency bands may be grouped in a complementary fashion and time division multiple access techniques (discussed in detail below) used to create symmetry between uplink and downlink user capacity, as also illustrated in FIG. 2. For example, in the aforementioned Ericsson system, each of the 200 KHz downlink carrier frequency bands may be associated with four (4) 50 KHz uplink carrier frequency bands. As can be seen, this results in associating 200 KHz of the spectrum allocated for downlinks with 200 KHz of the spectrum allocated for uplinks. Through the proper use of time-division multiple access techniques, a group of radiotelephones transmitted to by a satellite over a downlink carrier frequency band can therefore respond to the satellite over a complementary set of uplink carrier frequency bands.

In order to provide ample channel capacity and to efficiently use the radio spectrum, conventional terrestrial radiotelephone systems frequently operate using time division multiple access (TDMA), whereby radiotelephone communications signals for several radiotelephones are time-division-multiplexed on carrier frequency bands. As illustrated in FIG. 3, in a TDMA system, communications on each carrier frequency band occur over a series of sequential time slots 320, with individual users allocated one or more time slots such that during its allocated time slots, a user has access to the entire carrier frequency band. The user communicates with the base or hub station using "bursts," i.e., discrete packets of information, typically a finite stream of digital bits which are transmitted during its assigned time slots. To serve multiple users, the time slots may be repeated in successive frames 310, each including a predetermined number of time slots. Thus, in a typical TDMA system, a communications "channel" is a time slot allocated in a given carrier frequency band.

As illustrated in FIG. 3, time division multiplexing can provide symmetrical uplink/downlink user capacity for an asymmetrical downlink and uplink carrier frequency band allocation, by using a different number of slots per TDMA frame for uplinks versus downlinks. For example, the TDMA frame for the multiple uplink carrier frequency bands associated with a single downlink carrier band may be divided into a first number of time slots, providing a number of uplink channels equal to the product of the number of time slots in the frame and the number of uplink carrier frequency bands. To provide an equivalent number of downlink channels, the TDMA frame 310 for the associated downlink carrier frequency band can be operated using the number of time slots needed to provide the desired number of channels, as illustrated in FIG. 3. An example of such a time slot design is the aforementioned Ericsson system, wherein the TDMA time frame for the downlink contains 32 time slots, while the four uplink carrier frequency bands complementing the downlink carrier frequency band operate on a TDMA frame of the same duration, subdivided into only 8 time slots. In this manner, 32 uplink channels can be provided corresponding to the 32 downlink channels defined by the downlink TDMA frame.

Because it generally would be inefficient to permanently assign a TDMA channel to a radiotelephone, typical radiotelephone systems assign channels on an as-needed basis to more efficiently use the limited number of available channels. Therefore, a critical task in radiotelephone communications is providing a radiotelephone with access to the system, i.e., assigning a voice or data channel to a radiotelephone when it desires to communicate with another radiotelephone or with a landline telephone or conventional cellular radiotelephone via the PSTN. This task is encountered both when a radiotelephone attempts to place a call and when a radiotelephone attempts to respond to a page from another radiotelephone or conventional telephone.

Access to a radiotelephone communications system may be provided in a number of ways. For example, a polling technique may be utilized whereby a central or base station serially polls users, giving each an opportunity to request access in an orderly fashion, without contention. However, serial polling tends to be impractical for radiotelephone systems because typical radiotelephone systems may have hundreds, if not thousands, of users. Those skilles in the art will appreciate that serially polling this many users can be extremely inefficient, especially when one considers that many of the users may not desire access at all, or may not desire access at the particular moment they are polled.

For this reason, radiotelephone systems typically use random access techniques, whereby a radiotelephones desiring a voice or data channel randomly sends an access request to the base or hub station, which the central or base station acknowledges by establishing a communications channels to the requesting radiotelephone, if available. To deal with "collisions," i.e. simultaneous requests from multiple radiotelephones, the base station typically implements some form of contention-resolving protocol. For example, the station may refuse to acknowledge simultaneous requests, requiring a requesting radiotelephone to reassert its request if it continues to desire access after failing to establish a channel. Contention resolving protocols may also use a variety of predetermined delays and similar techniques to reduce the likelihood of collisions subsequent to a first collision. Contention logic used in the European GSM system is described in *The GSM System for Mobile Communications* published by M. Mouly and M. B. Pautet, 1992, at pages 368–72.

An example of a random access technique for a TDMA radiotelephone communications system is that used in the GSM system. In the GSM system, a set of Common Control Channels (CCCHs) is shared by radiotelephones in the system and includes one or more Random Access Channels (RACHs). In the GSM system, a RACH is a dedicated TDMA channel used by radiotelephones to request access to the communications system. Radiotelephones typically monitor the status of the RACH to determine whether other radiotelephones are currently requesting access. If a radiotelephone desires access and the RACH is idle, the radiotelephone typically transmits a random access channel signal, typically including the radiotelephone's identification and an identification of the telephone the radiotelephone desires to contact, in what is often referred to as a "RACH burst." The RACH burst is timed to fall within the assigned TDMA time slot for the RACH, for example, by waiting a predetermined period after acquiring synchronization with a synchronization signal transmitted by the base station and then transmitting the RACH burst.

However, there are problems associated with this access technique. Before requesting a channel, a radiotelephone may be only roughly synchronized with the base station TDMA frame, for example, by aligning its internal time reference with the synchronization signal transmitted by the base station in an open loop fashion. Closer synchronization, however, typically occurs only after the base station acknowledges the radiotelephone's request for access, and the radiotelephone is provided with signals transmitted from the base station in response to the radiotelephone's own transmissions which allow the propagation delay between the radiotelephone and the station to be determined. With this information, the radiotelephone can adjust its TDMA bursts to prevent collision with bursts from other radiotelephones arriving at the base station on adjacent TDMA slots.

However, a radiotelephone requesting access prior to such synchronization generally suffers from a time ambiguity with respect to other TDMA bursts in the system, because of the variation of propagation time with position in the coverage area. FIG. 4 illustrates timing relationships between a first radiotelephone, closely synchronized and communicating with the base station over a TDMA voice channel, and a second radiotelephone located a distance from the base station which desires access to system. Because the second radiotelephone is only roughly synchronized, its internal timing may be significantly skewed with respect to the TDMA frame of the base station, as illustrated. Uncompensated, this time skew may cause, for example, a RACH burst transmitted by the second radiotelephone to have a significant overlap 410 with voice or data communications transmitted by the first radiotelephone on an adjacent time slot. This overlap may cause undesirable interference and diminish communications quality.

As illustrated in FIG. 5, conventional terrestrial TDMA cellular radiotelephone systems may compensate for this problem by incorporating guard time or guard bits 510 in each TDMA slot 320. Guard bits are essentially buffer bits inserted in each time slot which the receiving unit disregards because they may be corrupted by overlapping RACH bursts and other sources of interference. Because the maximum time ambiguity in a terrestrial radiotelephone system tends to be relatively small with respect to a TDMA frame, the number of guard bits needed to ensure acceptable signal quality typically is small. For example, in the GSM system, approximately 68.25 guard bits are incorporated in each time slot, ensuring that RACH bursts from a radiotelephones as far as 35 kilometers away from the base station will not cause undue interference on other TDMA slots.

Using guard times or bits to prevent overlap of RACH bursts tends to be impractical for satellite TDMA radiotelephone systems, however, because the large area covered by a typical satellite beam and the large distance from the satellite to the radiotelephone can combine to create time ambiguities far larger than those experienced in conventional terrestrial TDMA cellular radiotelephone systems. For example, a radiotelephone communications signal in a satellite beam having a coverage area of an approximate 500 kilometer radius may have a differential propagation delay approaching 6 milliseconds for a radiotelephone located at the periphery of the coverage area, resulting in a comparable time ambiguity for RACH bursts. As a typical TDMA time frame may be only tens of milliseconds long and have a slot length of only a few microseconds, the number of guard bits needed to prevent interference from unsynchronized RACH bursts can be of a magnitude approaching the duration of an entire TDMA frame, and far longer than an individual time slot. Increasing the TDMA frame length and the time slot length to provide a sufficient number of guard bits generally is not a practical alternative, as this approach would tend to reduce the potential information rate of the communications channels.

SUMMARY OF THE INVENTION

In the light of the foregoing, it is an object of the present invention to provide systems and methods for random access in a time division multiple access (TDMA) satellite radiotelephone system which is not vulnerable to time ambiguity in random access channel requests.

It is another object of the present invention to provide systems and methods for random access in a TDMA satellite radiotelephone system which reduce the probability of random access channel request collision.

These objects, advantages and other features are provided according to the present invention by systems and methods for random access in a TDMA satellite radiotelephone system which communicate random access channel signals over a dedicated random access channel uplink carrier frequency band separate from time division multiplexed uplink carrier frequency bands used for voice, data or other communications. In a TDMA satellite radiotelephone communications system in which the carrier frequency spectrum is allocated such that sets of uplink carrier frequency bands are associated with each downlink carrier frequency band, multiple dedicated uplink carrier frequency bands for random access can be provided, preferably associated with a downlink carrier frequency band used to communicate a synchronization or other control signal from a satellite to radiotelephones.

Using dedicated uplink carrier frequency bands for communicating random access channel signals helps avoid time ambiguity problems which may be associated with using a TDMA time slot for random access, reducing the probability of collisions with other communication signals. Using dedicated carrier frequency bands for random access also can obviate the need to provide long guard times in TDMA time slots which can reduce the potential information capacity of the TDMA channels. Providing multiple dedicated uplink carrier frequency bands for random access also can reduce the probability of collision of access request, and intelligent reuse of multiple dedicated random access uplink carrier frequency bands can further reduce the probability of access collision. By associating multiple dedicated uplink carrier frequency bands for communicating random access signals to a complementary downlink carrier frequency band, the present invention also can provide for more efficient utilization of spectral resources.

In particular, in a time division multiple access satellite radiotelephone communications system which communicates radiotelephone communications signals between at least one satellite and at least one radiotelephone over a carrier frequency spectrum which includes a plurality of downlink carrier frequency bands and a plurality of uplink carrier frequency bands, downlink communicating means, responsive to at least one satellite, communicates radiotelephone communications signals over the plurality of downlink carrier frequency bands from the at least one satellite to at least one radiotelephone. Uplink communicating means, responsive to the at least one radiotelephone, communicates radiotelephone communications signals over the plurality of uplink carrier frequency bands from the at least one radiotelephone to the at least one satellite.

The uplink communicating means includes time division multiplexed signal communicating means for communicating radiotelephone communications signals over a time division multiplexed uplink carrier frequency band of the plurality of uplink carrier frequency bands. Random access channel signal communicating means, also included in the uplink communicating means, communicate random access channel radiotelephone communications signals from the at least one radiotelephone to the at least one base station over a dedicated random access channel uplink carrier frequency band of the plurality of uplink carrier frequency bands, the dedicated random access channel uplink carrier frequency band being different from the time division multiplexed uplink carrier frequency band. The random access channel signal communicating means may include means for communicating random access channel radiotelephone communications signals from a first radiotelephone to the at least one satellite over a first dedicated random access channel uplink carrier frequency band, and means for communicating random access channel radiotelephone communications signals from a second radiotelephone over a second dedicated random access channel uplink carrier frequency band different from the first dedicated random access channel uplink carrier frequency band. Thus, random access channel radiotelephone communications signals may be communicated over multiple uplink carrier frequency bands, reducing the likelihood of collisions between random access channel radiotelephone communications signals at a receiving satellite.

According to another aspect of the present invention, downlink communicating means includes means for communicating radiotelephone communications signals to radiotelephones located in a first coverage area, and means for communicating radiotelephone communications signal to radiotelephones located in a second coverage area. The random access channel signal uplink communicating means includes means for communicating random access channel radiotelephone communications signals from radiotelephones located in the first coverage area over a first dedicated random access channel uplink carrier frequency band, and means for communicating random access channel radiotelephone communications signals from radiotelephones located in the second coverage area over a second dedicated random access channel uplink carrier frequency band different from the first dedicated random access channel uplink carrier frequency band. Thus, geographical reuse of dedicated random access uplink carrier frequency bands is provided, allowing intelligent frequency planning to reduce the likelihood of the collision of random access channel radiotelephone communications signals from adjacent coverage areas.

According to another aspect of the present invention, the carrier frequency spectrum used by the radiotelephone communications system is allocated such that a downlink carrier frequency band is associated with a group of uplink carrier frequency bands. The downlink communicating means may communicate radiotelephone communications signals over one of the plurality of downlink carrier frequency bands and the random access channel signal communicating means may communicate random access channel signals over at least one random access channel uplink carrier frequency band from the group of uplink carrier frequency bands associated with the one of the plurality of downlink carrier frequency bands. Preferably, the one of the plurality of downlink carrier frequency bands is a synchronization downlink carrier frequency band over which a synchronization signal is communicated to radiotelephones. Thus, multiple dedicated random access channel uplink carrier frequency bands may be provided while efficiently utilizing spectral resources.

According to another aspect of the present invention, a radiotelephone for communicating time division multiplexed radiotelephone communications signals to a satellite includes time division multiple access uplink communicating means for communicating time division multiplexed radiotelephone communications signals to the satellite over a time division multiplexed uplink carrier frequency band and random access channel signal communicating means for communicating random access channel radiotelephone communications signals to the satellite over a dedicated random access channel uplink carrier frequency band different from the time division multiplexed uplink carrier frequency band. If the satellite communicates radiotelephone communications signals to radiotelephones in a first coverage area and communicates radiotelephone communications signals to radiotelephones located in a second coverage area, the random access channel signal communicating means may include means for communicating random access channel radiotelephone communications signals over a first random access uplink carrier frequency band when the radiotelephone is located in the first coverage area, and means for communicating random access channel radiotelephone communications signals over a second dedicated random access channel uplink carrier frequency band different from the first random access uplink carrier band when the radiotelephone is located in the second coverage area. Thus, geographical reuse of dedicated random access uplink carrier frequency bands is provided, allowing intelligent frequency planning to reduce the likelihood of the collision of random access channel radiotelephone communications signals from adjacent coverage areas.

According to another aspect, a satellite for communicating radiotelephone communications signals to at least one radiotelephone in a time division multiple access satellite radiotelephone communications system, over a carrier frequency spectrum including a plurality of downlink carrier frequency bands and a plurality of uplink carrier frequency bands, includes downlink communicating means for communicating radiotelephone communications signals over the plurality of downlink carrier frequency bands to the at least one radiotelephone, and uplink communicating means, responsive to the at least one radiotelephone, for communicating radiotelephone communications signals from a radiotelephone to the satellite over a plurality of uplink carrier frequency bands.

The uplink communicating means includes time division multiplexed signal communicating means for communicating time division multiplexed radiotelephone communications signals from a radiotelephone to the satellite over a time division multiplexed uplink carrier frequency band of the plurality of uplink carrier frequency bands, such as an antenna and receiver positioned on the satellite. The uplink communicating means also includes random access channel signal communicating means, such as an antenna and receiver positioned on the satellite, for communicating random access channel radiotelephone communications signals communicated from a radiotelephone to the satellite over a dedicated random access channel uplink carrier frequency band of the plurality of uplink carrier frequency bands, the dedicated random access channel uplink carrier frequency band being different from the time division multiple access uplink carrier frequency band. The random access channel signal communicating means may include means for communicating random access channel radiotelephone communications signals from a first radiotelephone over a first dedicated random access channel uplink carrier frequency band and means for communicating random access channel radiotelephone communications signals from a second radiotelephone over a second dedicated random access channel uplink carrier frequency band different from the first dedicated random access channel uplink carrier frequency band.

According to another aspect, the downlink communicating means of the satellite may include means for communicating radiotelephone signals to radiotelephones located in a first coverage area and means for communicating radiotelephone communications signals to radiotelephones located in a second coverage area. The random access channel signal communicating means may include means for communicating radiotelephone access channel radiotelephone communications signals from radiotelephones located in the first coverage area over a first dedicated random access channel uplink carrier frequency band, and means for communicating radiotelephone access channel radiotelephone communications signals from radiotelephones located in the second coverage area over a second dedicated random access channel uplink carrier frequency band different from the first dedicated random access channel uplink carrier frequency band. Thus, geographical reuse of the dedicated random access channel uplink carrier frequency bands is provided, allowing the likelihood of collision of random access channel radiotelephone communications signals from radiotelephones located in adjacent coverage areas to be reduced.

The carrier frequency spectrum may be allocated into a plurality of uplink carrier frequency bands and a plurality of downlink carrier frequency bands such that each of the downlink carrier frequency bands is associated with a group of the uplink carrier frequency bands. The downlink communicating means may include means for communicating radiotelephone communications signals over a one of the plurality of downlink carrier frequency bands and the random access channel signal communicating means may include means for communicating random access channel radiotelephone communications signals over at least one dedicated random access channel uplink carrier frequency band of the group of uplink carrier frequency bands associated with the one of the plurality of downlink carrier frequency bands. Preferably, one of the plurality of downlink carrier frequency bands is a synchronization downlink carrier frequency band over which a synchronization signal is communicated to radiotelephones. Thus, multiple dedicated random access channel uplink carrier frequency bands may be provided while efficiently utilizing spectral resources.

Methods of providing a radiotelephone with access to a time division multiple access satellite radiotelephone communications system according to the present invention include communicating random access channel radiotelephone communications signals from the radiotelephone to a satellite over a dedicated random access channel uplink carrier frequency band. In response to the communicated random access channel radiotelephone communications signals, a time division multiple access channel on a time-division multiplexed uplink carrier frequency band different from said dedicated random access channel uplink carrier frequency band is assigned. Time division multiplexed radiotelephone communications signals from the radiotelephone to the satellite are then communicated over the allocated time division multiple access channel on the time division multiplexed uplink carrier frequency band.

The step of communicating random access signals may also include communicating random access channel radiotelephone communications signals to the satellite from a first radiotelephone over a first dedicated random access channel uplink carrier frequency band or communicating random access channel radiotelephone communications signals from a second radiotelephone over a second dedicated random access channel uplink carrier frequency band different from the first dedicated random access channel uplink carrier frequency band. For a system in which the satellite communicates radiotelephone communications signals to radiotelephones located in a first coverage area and communicates radiotelephone communications signals to radiotelephones located in a second coverage area, communicating random access channel radiotelephone communications signals may include communicating random access channel radiotelephone communications signals over a first dedicated random access uplink carrier frequency band if the radiotelephone is located in the first coverage area or communicating random access radiotelephone communications signals over a second dedicated random access channel uplink carrier frequency band different from the first dedicated random access uplink carrier band if the radiotelephone is located in the second coverage area. Thus, geographical reuse of the dedicated random access channel uplink carrier frequency bands is provided, allowing the likelihood of collision of random access channel radiotelephone communications signals from radiotelephones located in adjacent coverage areas to be reduced.

According to another method aspect, a time division multiple access satellite radiotelephone communications system is accessed from a radiotelephone by communicating random access channel radiotelephone communications signals from the radiotelephone to a satellite over a dedicated random access channel uplink carrier frequency band. In response to the allocation of a time division multiple access channel, time division multiplexed radiotelephone communications signals are communicated from the radiotelephone to the satellite over a time division multiple access channel on a time division multiplexed uplink carrier frequency band.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF ILLUSTRATED EMBODIMENTS

Figure 1:
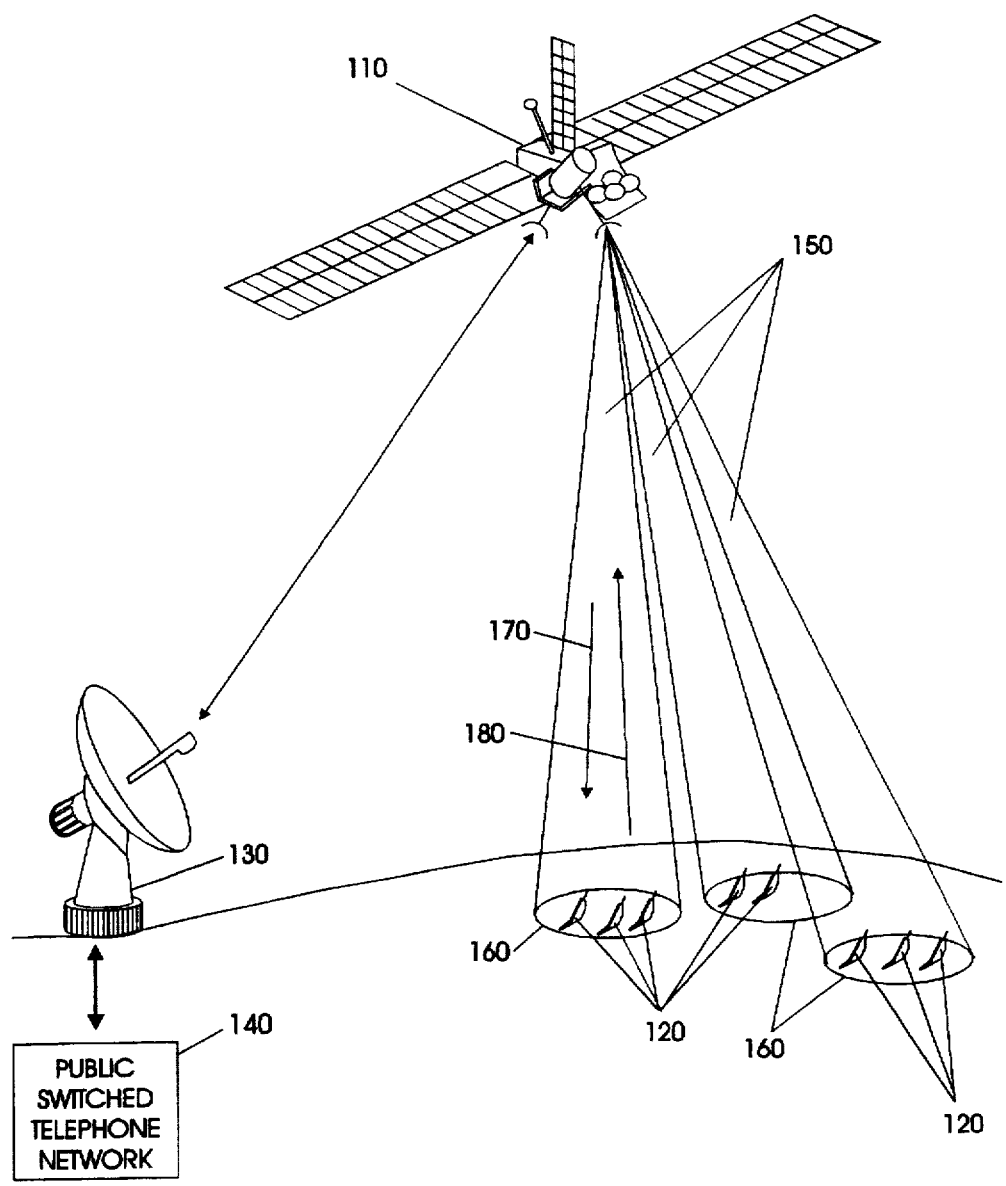
FIG. 1 illustrates a satellite communications system according to the prior art.
Figure 2:
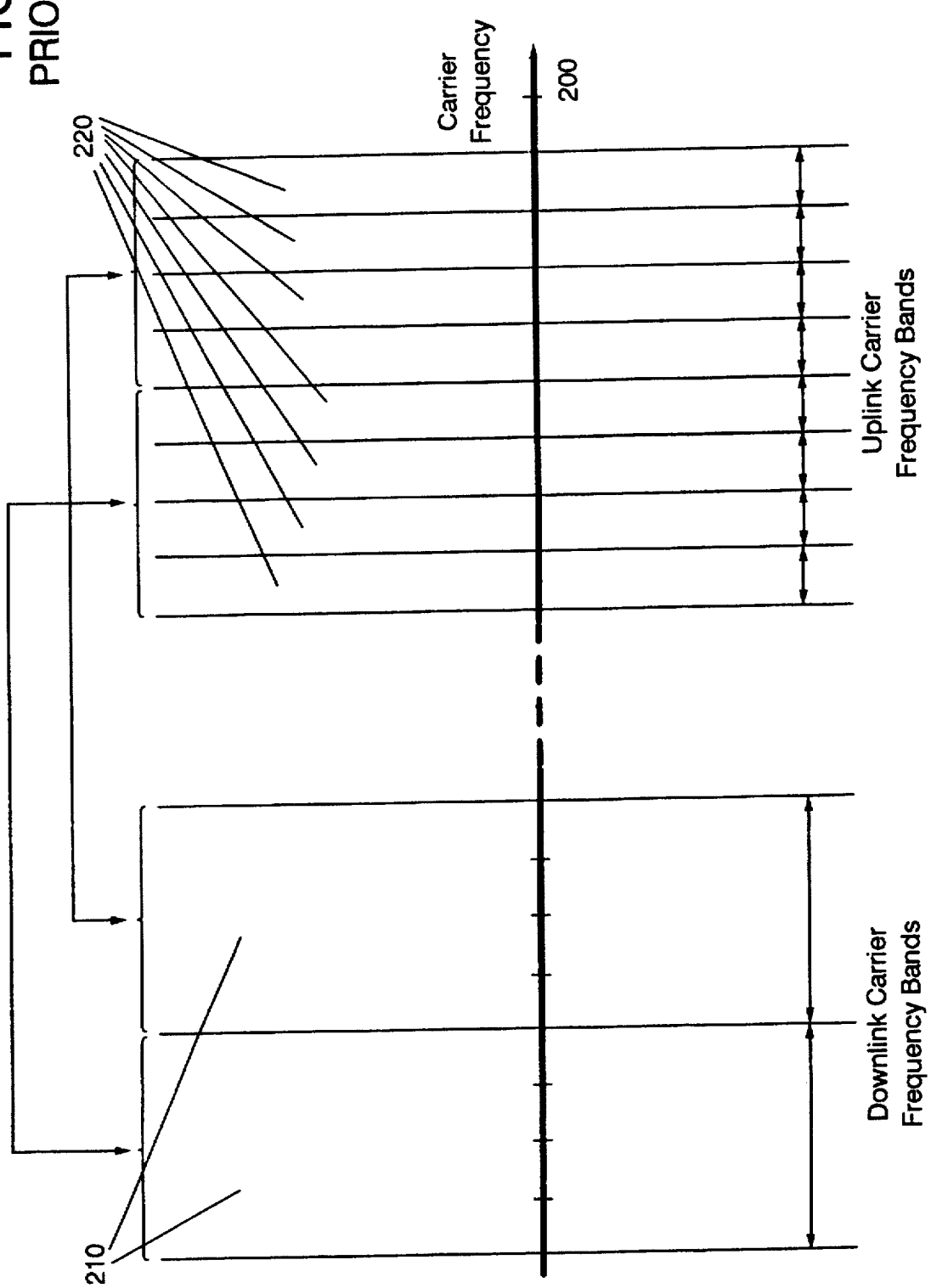
FIG. 2 illustrates allocation of a carrier frequency spectrum for a radiotelephone communications system according to the prior art.
Figure 3:
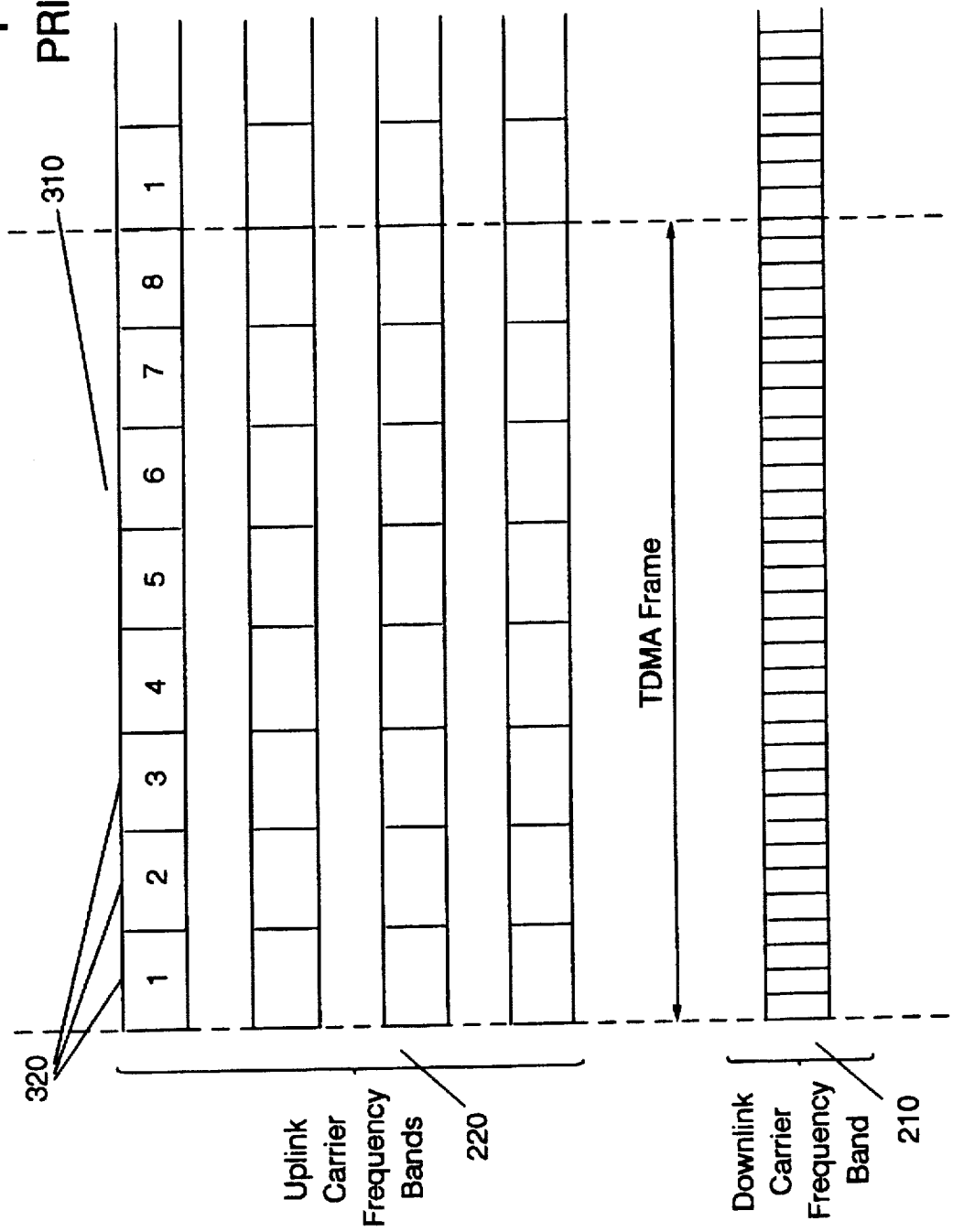
FIG. 3 illustrates time slots and frames utilized in a TDMA radiotelephone communications system according to the prior art.
Figure 4:
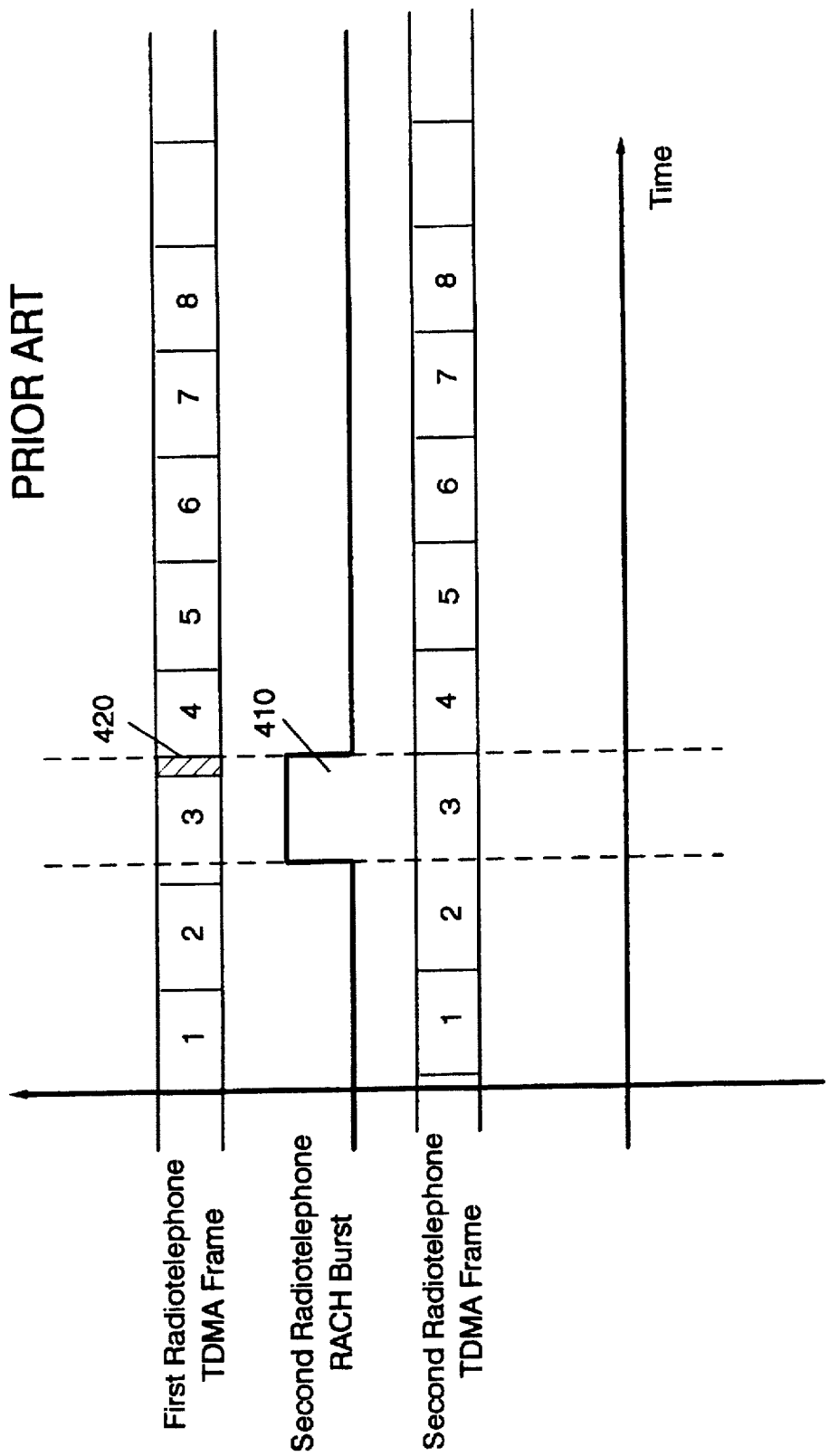
FIG. 4 illustrates timing relationships between radiotelephones in a TDMA radiotelephone communications system according to the prior art.
Figure 5:
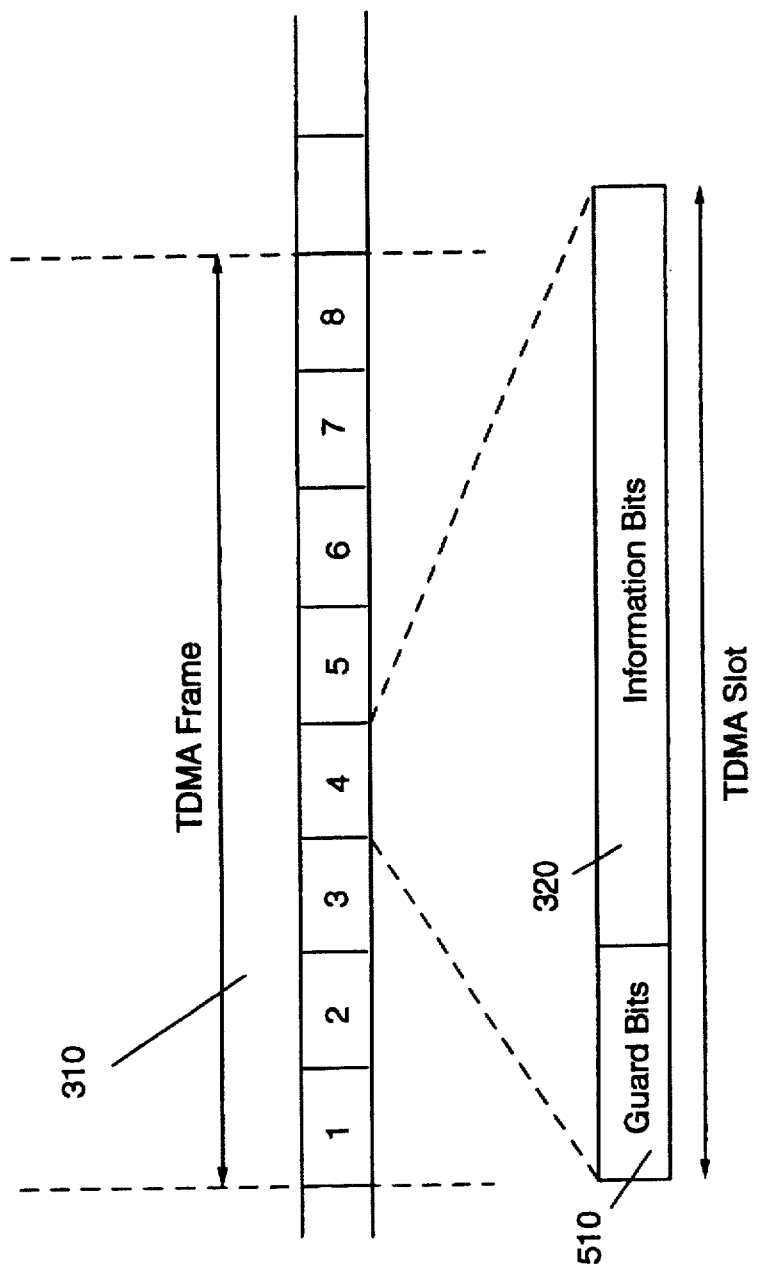
FIG. 5 illustrates bit designations in a TDMA time slot of a TDMA radiotelephone communications system according to the prior art.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 6:
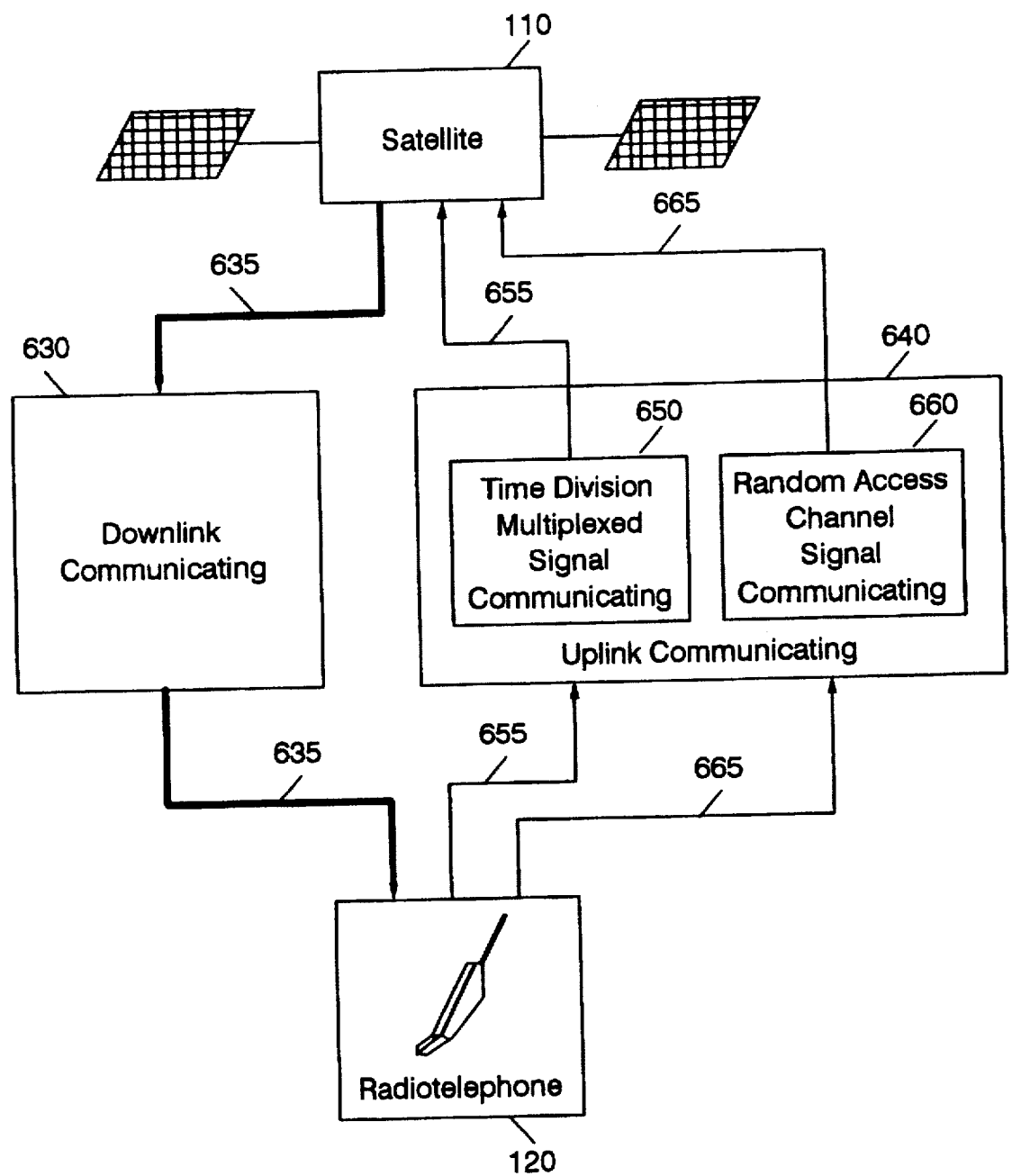
FIG. 6 illustrates a TDMA satellite radiotelephone communications system according to the present invention.
Figure 7:
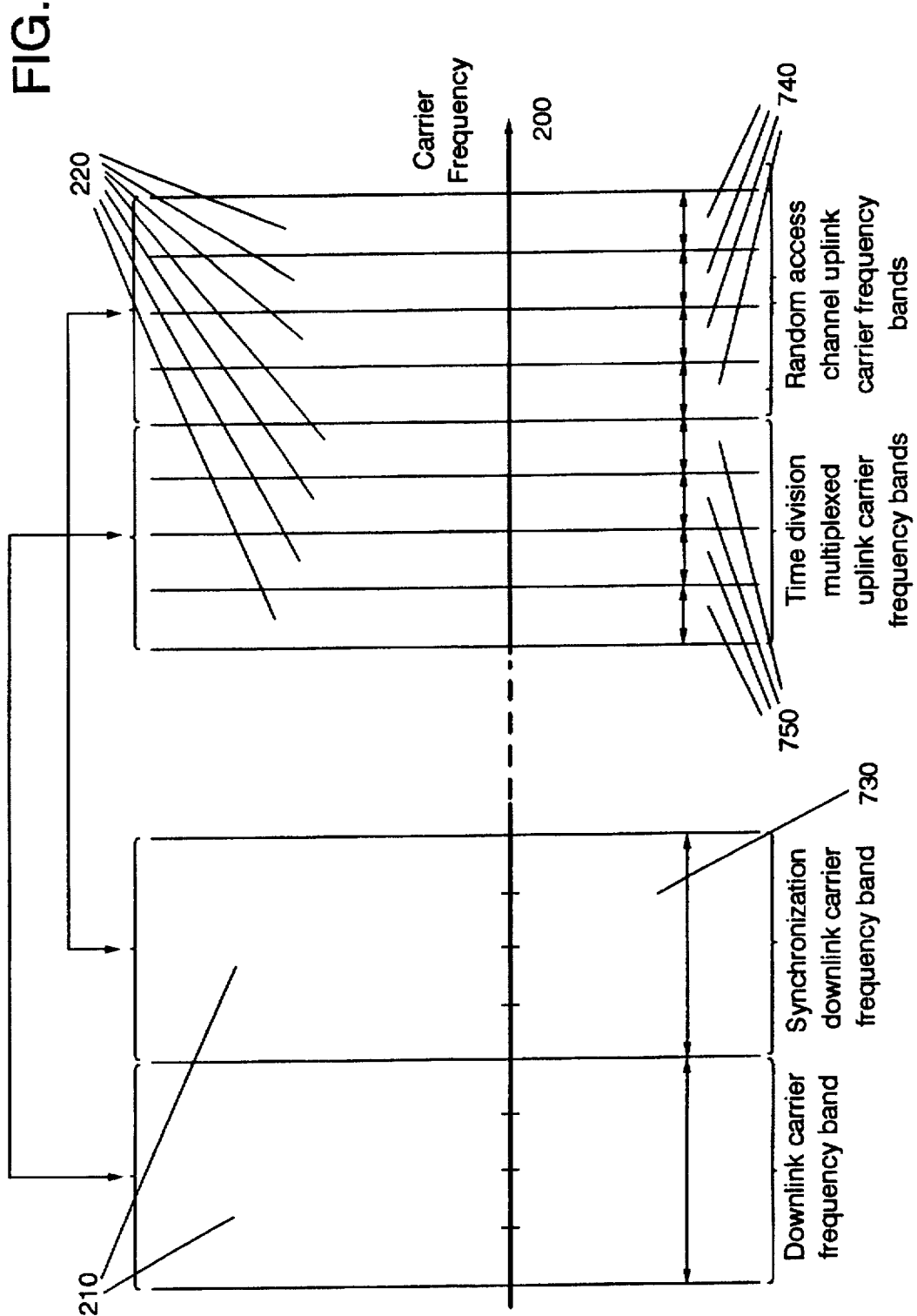
FIG. 7 illustrates a carrier frequency allocation in a TDMA satellite radiotelephone communications system according to the present invention.

Referring now to FIGS. 6 and 7, a time division multiple access satellite radiotelephone communications system according to the present invention is illustrated. Downlink communicating means 630 communicates radiotelephone communications signals 635 from a satellite 110 to a radiotelephone 120. Similarly, uplink communicating means 640 communicates radiotelephone communications signals 655, 665 from the radiotelephone 120 to the satellite 110. The uplink communicating means 640 further includes time division multiplexed signal communicating means 650 for communicating time division multiplexed radiotelephone communications signals 655 from the radiotelephone 120 to the satellite 110, and random access channel signal communicating means 660 for communicating random access channel radiotelephone communications signals 665 from the radiotelephone 120 to the satellite 110.

As illustrated in FIG. 7, the downlink communicating means 620 communicates radiotelephone communications signals over a plurality of downlink carrier frequency bands 210 in a carrier frequency spectrum 200. As will be understood by those skilled in the art, downlink communicating means 620 may include components commonly used in satellite communications systems to communicate radiotelephone signals from one location to another. These components may include, for example, transmitters positioned in satellites 110 which transmit radiotelephone communications signals over the downlink and uplink carrier frequency bands, receivers positioned in radiotelephones 120 which receive the transmitted signals, as well as other communications components, such as antennas, amplifiers, switching devices, mixers, modulators, memory devices, signal processors and the like, implemented in special purpose analog and digital hardware, in general purpose computing devices running computer software, or in combinations thereof.

The uplink communicating means 640 communicates radiotelephone communications signals over a plurality of uplink carrier frequency bands 220 in the carrier frequency spectrum 200. As will be appreciated by those skilled in the art, the time division multiplexed signal communicating means 650 communicates radiotelephone communications signals from several radiotelephones 120, with the signals to and from each radiotelephone being time division multiplexed over a series of TDMA time slots. In this manner, multiple radiotelephones may utilize the same uplink carrier frequency band with minimized co-channel interference, while allowing more efficient spectrum utilization than traditional frequency division multiple access (FDMA) systems which continuously assign an entire carrier frequency band to a single user. The random access channel signal communicating means 660 operates over dedicated uplink carrier frequency bands 740, reducing interference of random access channel signals with TDMA communications occurring on the time division multiplexed uplink carrier frequency bands.

As will be understood by those skilled in the art, uplink communicating means 630 may include components commonly used in satellite communications systems to communicate radiotelephone signals from one location to another. For example, the uplink communicating means 630 may include transmitters positioned in the radiotelephones 120 which transmit radiotelephone communications signals over the uplink carrier frequency bands 220, receivers positioned in satellites 110 which receive the transmitted radiotelephone communications signals, and various other communications components such as antennas, amplifiers, switching devices, mixers, demodulators, memory devices, signal processors and other communications components, implemented in special purpose analog and digital hardware, in general purpose computing devices running computer software, or in combinations thereof.

As illustrated in FIG. 7, the carrier frequency spectrum 200 may be allocated among downlink carrier frequency bands 210 and uplink carrier frequency bands 220 such that a group of uplink carrier bands 220 is associated with each downlink carrier frequency band 210. As will be appreciated by those skilled in the art, such an allocation may be desirable in a communications system in which full duplex capability is desired having approximately the same channel capacity on the downlink and uplink sides of the system. According to the present invention, the downlink communicating means 620 may communicate synchronization radiotelephone communications signals from the satellite 110 to radiotelephones 120 over a synchronization downlink carrier frequency band 730 of the plurality of downlink carrier frequency bands 210, and the random access channel signal communicating means 660 may communicate random access radiotelephone communications signals from radiotelephones 120 to a satellite 110 over at least one of the uplink carrier frequency bands 740 associated with the synchronization downlink carrier frequency band 730, thus efficiently utilizing spectrum resources. Those skilled in the art will understand that synchronization radiotelephone communications signals may be communicated on the entire downlink carrier frequency band 730, or on one or more time slots of the downlink carrier frequency band 730. For example, synchronization radiotelephone communication signals may be communicated on a single time slot of the downlink carrier frequency band 730, and random access radiotelephone communications signals may be communicated on an uplink carrier frequency band having a time slot complementary to the time slot used for the synchronization radiotelephone communications signals. Those skilled in the art will also understand that although the aforementioned carrier frequency band grouping is preferred, other groupings of uplink and downlink carrier frequency bands may be used with the present invention. For example, the random access channel uplink carrier frequency bands may be associated with a different downlink carrier frequency band dedicated for communicating radiotelephone communications signals from the satellite to radiotelephones, such as other timing or control signals.

Figure 8:
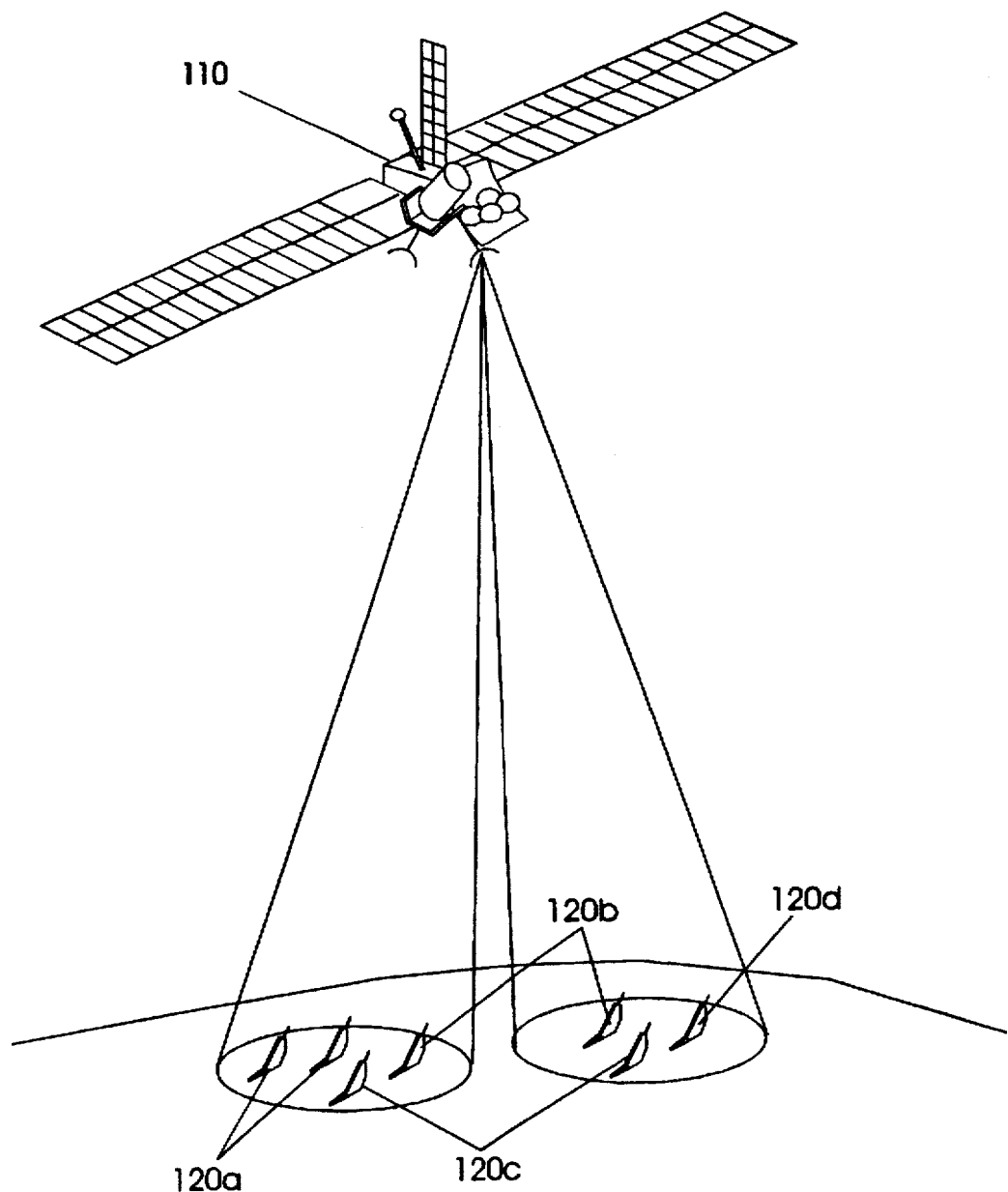
FIG. 8 illustrates reuse of dedicated random access channel uplink carrier frequency bands according to the present invention.
Figure 9:
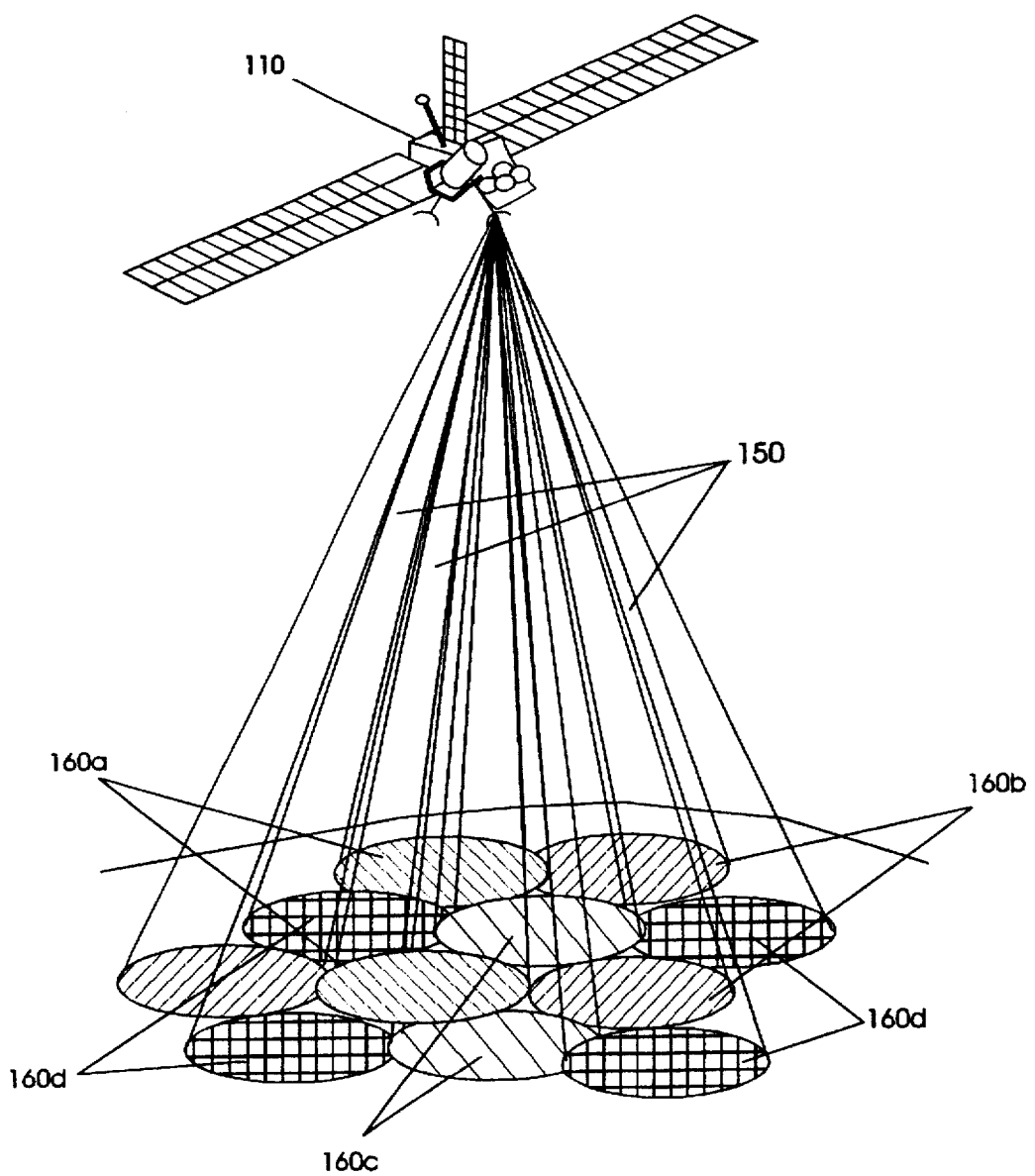
FIG. 9 illustrates geographical reuse of dedicated random access channel uplink carrier frequency bands according to the present invention.

The use of multiple dedicated random access channel carrier frequency bands can reduce the likelihood of random access request collisions. As illustrated in FIG. 8, individual radiotelephones 120a–d can each be assigned a particular dedicated random access channel uplink carrier frequency band for transmitting RACH bursts, to randomly distribute the use of random access channel carrier frequency bands. By using multiple dedicated random access channel uplink carrier frequency bands, the likelihood of access request collisions is reduced because it is less likely for two radiotelephones to simultaneously transmit RACH bursts on the same carrier frequency band. As illustrated in FIG. 9, a geographical reuse plan may also be utilized, whereby different dedicated random access channel uplink carrier frequency bands are used for different coverage areas 160a–d of the area served by a radiotelephone communications system. By employing such frequency reuse planning, RACH bursts from adjacent coverage areas are less likely to interfere with one another, thus reducing the number of failed accesses and related problems caused by radiotelephones in adjacent areas transmitting RACH burst on the same frequency band simultaneously.

Figure 10:
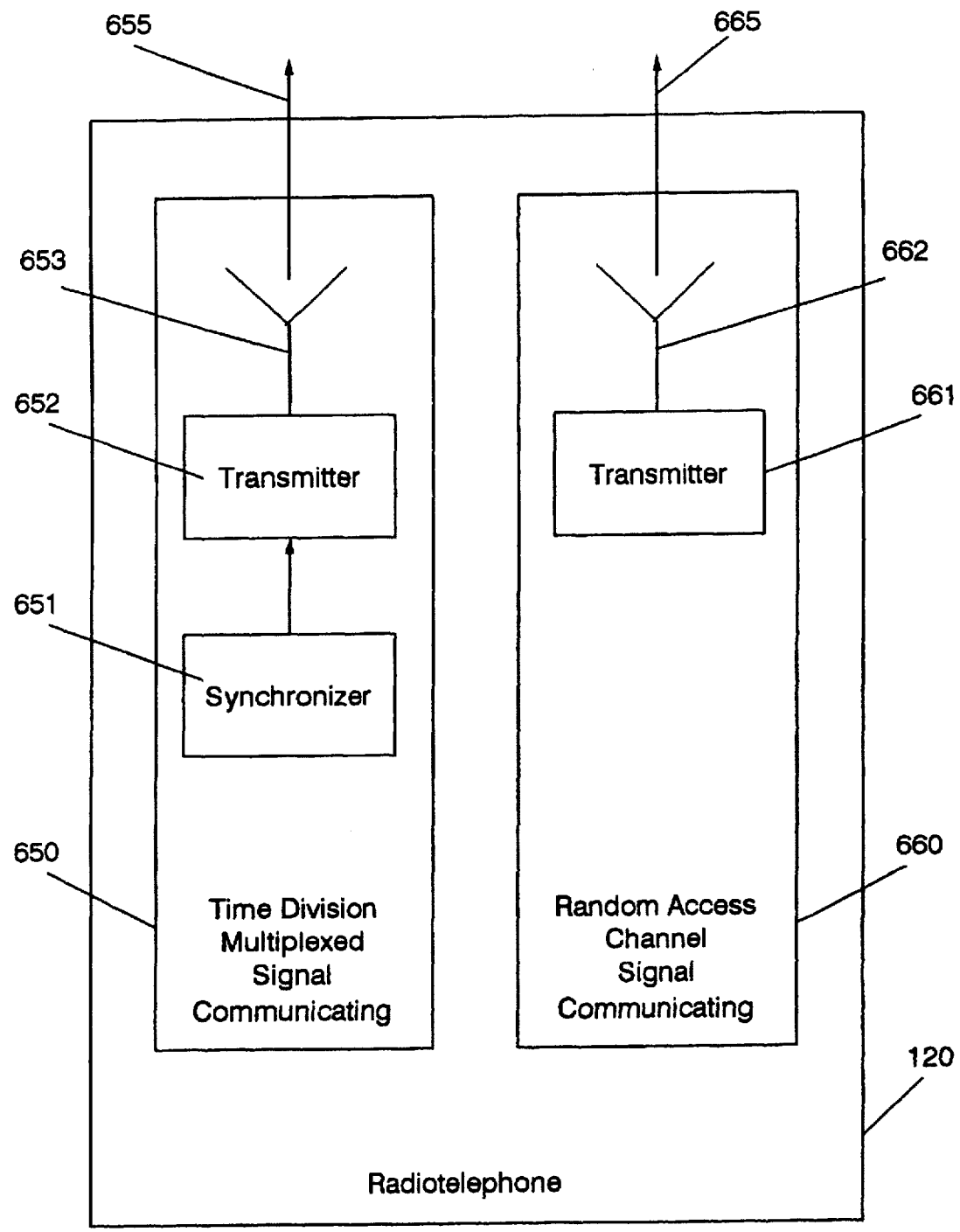
FIG. 10 illustrates a radiotelephone for accessing a TDMA satellite radiotelephone communications system according to the present invention.

As illustrated in FIG. 10, the radiotelephone 120 may include time division multiplexed signal communicating means 650 for communicating time division multiplexed radiotelephone communications signals to a satellite 110 and random access channel signal communicating means 660 for communicating random access radiotelephone communications signals to the satellite 110. For example, as illustrated, the time division multiplexed signal communicating means 650 may include a synchronizer 651 which times the radiotelephone communications signals to fall within an appropriate TDMA time slot, and a transmitter 652 which transmits time division multiplexed radiotelephone communications signals 655 via an antenna 653. Similarly, the random access channel signal communicating means 660 may include a transmitter 661 which transmits random access radiotelephone communications signals via an antenna 654. Those skilled in the art will understand that various configurations of transmitters, synchronizers, antennas may be used with the present invention, such using a single wideband antenna and transmitter to transmit both time division multiplexed and random access channel signals. It will also be understood that the time division multiplexed signal communicating means 650 and the random access channel signal communicating means 660 may also include other communications components such as switching devices, amplifiers, signal processors and the like, implemented in special purpose analog or digital hardware or in software running on general purpose computers.

Figure 11:
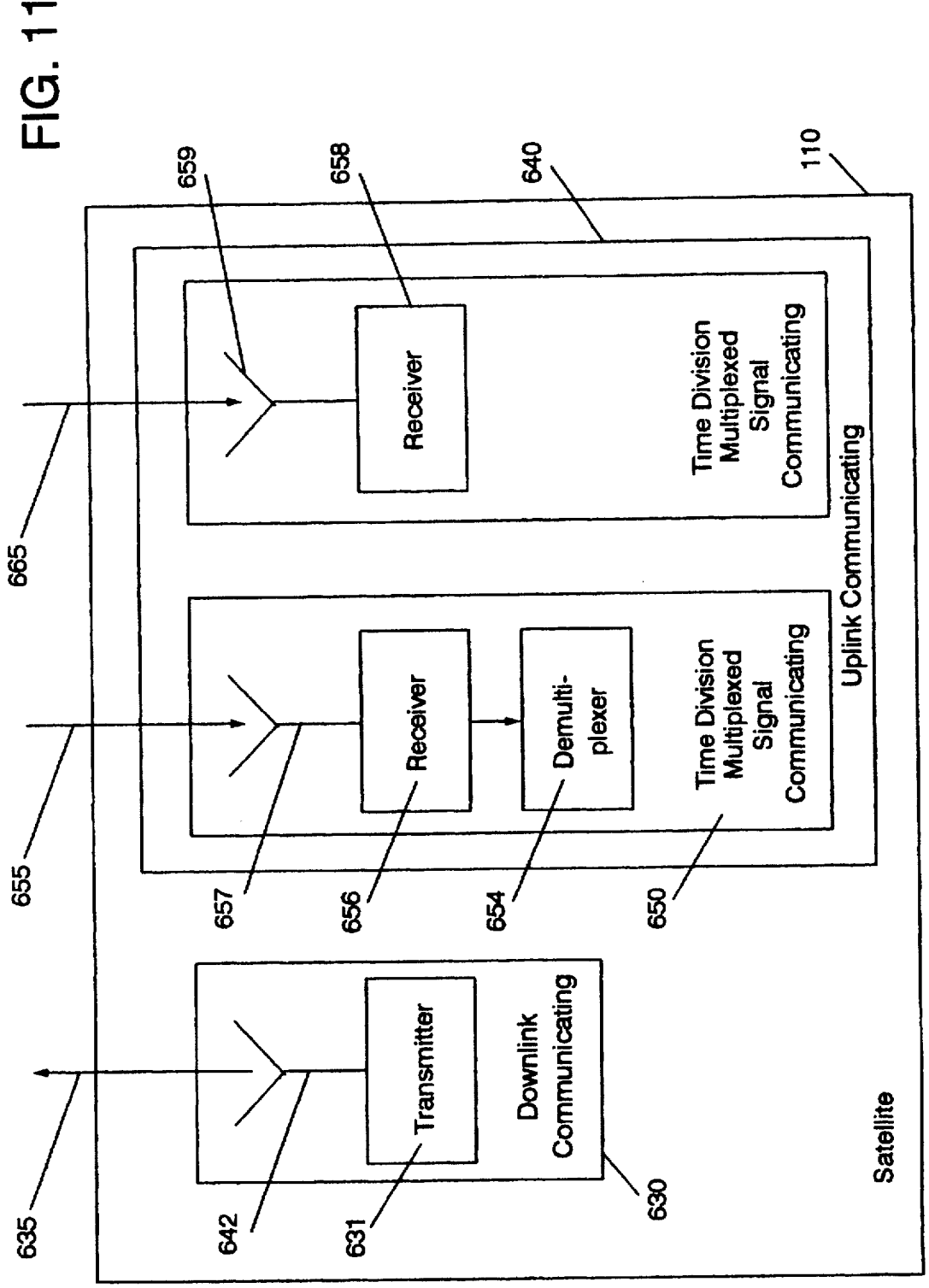
FIG. 11 illustrates a satellite for use in TDMA satellite radiotelephone communications system according to the present inventions.

As illustrated in FIG. 11, the satellite 110 may include uplink communicating means 640, including the time division multiplexed signal communicating means 650 and the random access channel communicating means 660. For example, the satellite 110 may include a receiver 656 which receives time division multiplexed signals 655 such as those transmitted by a radiotelephone 120 of the type illustrated in FIG. 10, via an antenna 657 and demultiplexes the received signals in a demultiplexer 654. Similarly, the satellite may include another receiver 658 which receives random access channel radiotelephone communications signals 665 via an antenna 659. Those skilled in the art will appreciate that other configurations may be used with the present invention, and that the time division multiplexed signal communicating means 650 and the random access channel signal communicating means 660 may also include communications components such as switching devices, mixers, demodulators, signal processors, and the like, implemented in special purpose analog and digital hardware, in general purpose processors running computer software, or in combinations thereof.

The downlink communicating means 630 of FIG. 6 may be also be included in the satellite 110. For example, as illustrated in FIG. 11, the satellite 110 may include a transmitter 631 which communicates radiotelephone communications signals via an antenna 642. It will be understood that the downlink communicating means 630 may also include other communications components such as equalizers, demodulators, demultiplexers, signal processors and the like, implemented in special purpose analog or digital hardware or in software running on general purpose processors.

Figure 12:
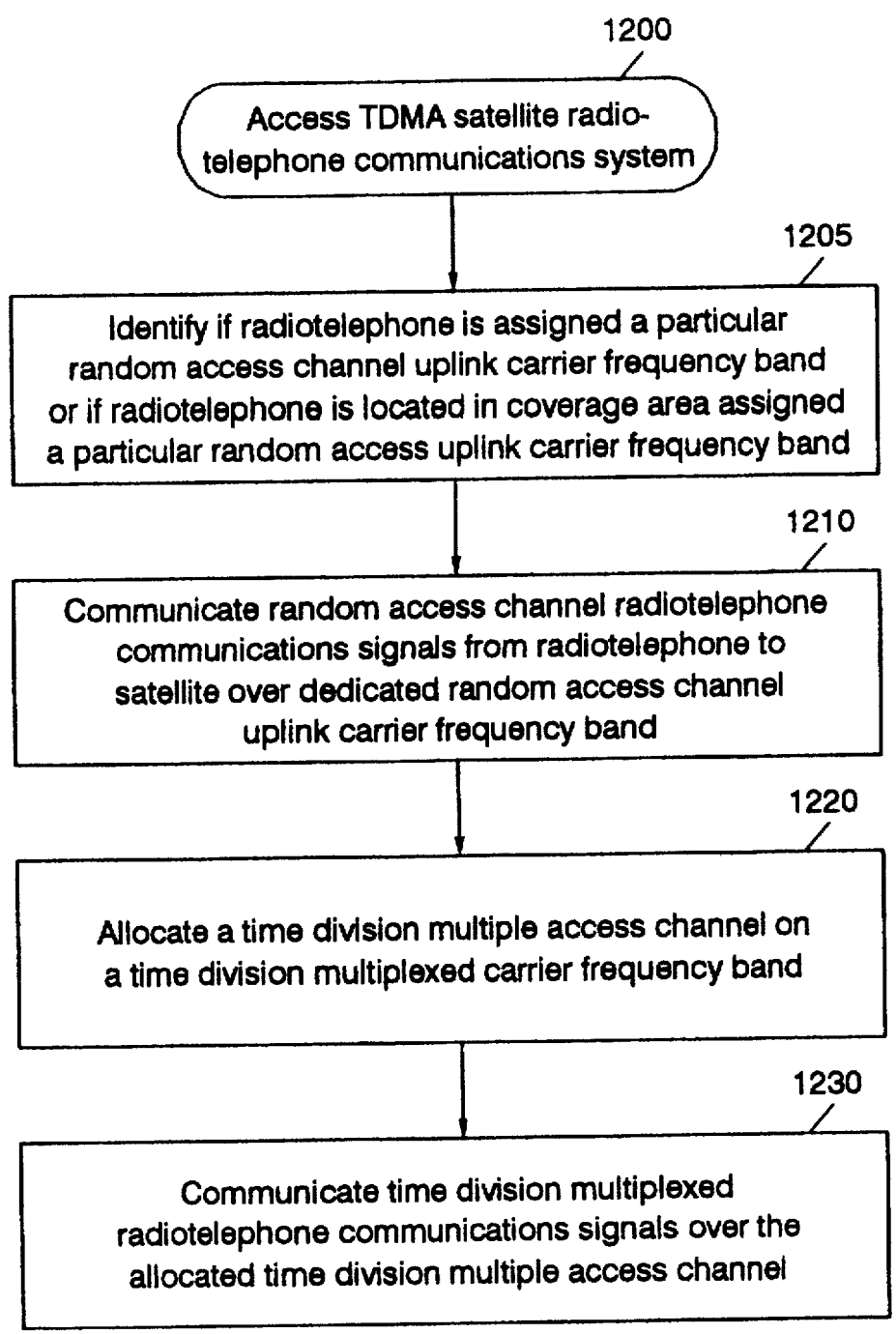
FIG. 12 illustrates operations for accessing a TDMA satellite radiotelephone communications system according to the present invention.

Operations for providing access to a time division multiple access satellite radiotelephone communications system are illustrated in FIG. 12 (Block 1200). Random access channel radiotelephone communications signals are communicated from a radiotelephone to a satellite over a dedicated random access channel uplink carrier frequency band (Block 1210). In response, a time division multiple access channel on a time division multiplexed uplink carrier frequency band different from the dedicated random access channel uplink carrier frequency band is assigned (Block 1220). After the channel is assigned, time division multiplexed radiotelephone communications signals are communicated from the radiotelephone to the satellite over the assigned time division multiple access channel on the time division multiplexed uplink carrier frequency band (Block 1230). The step of communicating random access channel radiotelephone communications signals may be preceded by the step of identifying if the radiotelephone is assigned a particular dedicated random access channel uplink carrier frequency band or if the radiotelephone is in a particular coverage area to which a particular dedicated random access channel uplink carrier frequency band is assigned (Block 1205), and the step of communicating random access channel radiotelephone communications signals (Block 1210) may include communicating random access channel radiotelephone communications signals based on the assigned dedicated random access channel uplink carrier frequency band.

As shown in the illustrated embodiments, present invention provides for communicating random access channel signals over a dedicated random access channel uplink carrier frequency band, thus avoiding the time ambiguity problems which may be associated with using a TDMA slot for random access. Using dedicated carrier frequency bands can also obviate the need to provide excessive guard time in TDMA time slots which may decrease the potential information capacity of the TDMA channels used for voice, data or other communications. Providing multiple dedicated random access channel uplink carrier frequency bands also can reduce the probability of access request collision, and allow for random or geographical carrier frequency band reuse which can further reduce the probability of access request collision.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A time division multiple access satellite radiotelephone communications system for communicating radiotelephone communications signals between at least one satellite and at least one radiotelephone over a carrier frequency spectrum including a plurality of downlink carrier frequency bands and a plurality of uplink carrier frequency bands, the system comprising:

downlink communicating means, responsive to the at least one satellite, for communicating radiotelephone communications signals from the at least one satellite to the at least one radiotelephone over the plurality of downlink carrier frequency bands; and uplink communicating means, responsive to the at least one radiotelephone, for communicating radiotelephone communications signals from the at least one radiotelephone to the at least one satellite over the plurality of uplink carrier frequency bands, said uplink communicating means comprising:

time division multiplexed signal communicating means for communicating time division multiplexed radiotelephone communications signals over a time division multiplexed uplink carrier frequency band of the plurality of uplink carrier frequency bands; and random access channel signal communicating means for communicating random access channel radiotelephone communications signals over a dedicated random access channel uplink carrier frequency band of the plurality of uplink carrier frequency bands, said dedicated random access channel uplink carrier frequency band being different from said time division multiplexed uplink carrier frequency band, said dedicated random access channel unlink carrier frequency band being dedicated to communication of random access channel radiotelephone communications signals.

2. A system according to claim 1:

wherein said downlink communicating means comprises:
    means for communicating radiotelephone signals to radiotelephones located in a first coverage area; and
    means for communicating radiotelephone communications signals to radiotelephones located in a second coverage area; and wherein said random access channel signal communicating means comprises:
    means for communicating random access channel radiotelephone communications signals from radiotelephones located in said first coverage area over a first dedicated random access channel uplink carrier frequency band; and
    means for communicating random access channel radiotelephone communications signals from radiotelephones located in said second coverage area over a second dedicated random access channel uplink carrier frequency band different from said first dedicated random access channel uplink carrier frequency band.

3. A system according to claim 1 wherein said random access channel signal communicating means comprises:

means for communicating random access channel radiotelephone communications signals from a first radiotelephone to the at least one satellite over a first dedicated random access channel uplink carrier frequency band; and means for communicating random access channel radiotelephone communications signals from a second radiotelephone to the at least one satellite over a second dedicated random access channel uplink carrier frequency band different from said first dedicated random access channel uplink carrier frequency band.

4. A system according to claim 1 wherein the carrier frequency spectrum includes a plurality of downlink carrier frequency bands and a plurality of uplink carrier frequency bands allocated such that each of the downlink carrier frequency bands is associated with a group of uplink carrier frequency bands:

wherein said downlink communicating means comprises means for communicating radiotelephone communications signals over one of the plurality of downlink carrier frequency bands; and wherein said random access channel signal communicating means comprises means for communicating random access channel radiotelephone communications signals over at least one dedicated random access channel uplink carrier frequency band of the group of uplink carrier frequency bands associated with said one of the plurality of downlink carrier frequency bands.

5. A system according to claim 4:

wherein said downlink communicating means comprises means for communicating synchronization radiotelephone communications signals over a synchronization downlink carrier frequency band; and wherein said random access channel communicating means comprises means for communicating random access channel radiotelephone communications signals over at least one dedicated random access channel uplink carrier frequency band of the group of uplink carrier frequency bands associated with said synchronization downlink carrier frequency band.

6. A radiotelephone for communicating time division multiplexed radiotelephone communications signals to a satellite in a time division multiple access satellite radiotelephone communications system, the radiotelephone comprising:

time division multiplexed signal communicating means for communicating time division multiplexed radiotelephone communications signals to the satellite over a time division multiplexed uplink carrier frequency band; and random access channel signal communicating means for communicating random access channel radiotelephone communications signals to the satellite over a dedicated random access channel uplink carrier frequency band different from said time-division-multiplexed uplink carrier frequency band, said dedicated random access channel uplink carrier frequency band being dedicated to communication of random access channel radiotelephone communications signals.

7. A radiotelephone according to claim 6 wherein the satellite communicates radiotelephone communications signals to radiotelephones in a first coverage area over a first downlink carrier frequency band and communicates radiotelephone communications signals to radiotelephones located in a second coverage area over a second downlink carrier frequency band, and wherein said random access channel signal communicating means comprises:

means for communicating random access channel radiotelephone communications signals over a first random access uplink carrier frequency band when the radiotelephone is located in the first coverage area; and means for communicating random access channel radiotelephone communications signals over a second dedicated random access channel uplink carrier frequency band different from said first random access uplink carrier band when the radiotelephone is located in the second coverage area.

8. A satellite for communicating radiotelephone communications signals to at least one radiotelephone in a time division multiple access satellite radiotelephone communications system over a carrier frequency spectrum including a plurality of downlink carrier frequency bands and a plurality of uplink carrier frequency bands, the satellite comprising:

downlink communicating means for communicating radiotelephone communications signals to the at least one radiotelephone over the plurality of downlink carrier frequency bands; and uplink communicating means, responsive to the at least one radiotelephone, for communicating radiotelephone communications signals from radiotelephones to the satellite over the plurality of uplink carrier frequency bands, said uplink communicating means comprising:

time division multiplexed signal communicating means for communicating time division multiplexed radiotelephone communications signals over a time division multiplexed uplink carrier frequency band of the plurality of uplink carrier frequency bands; and random access channel signal communicating means for communicating random access channel radiotelephone communications signals over a dedicated random access channel uplink carrier frequency band of the plurality of uplink carrier frequency bands, said dedicated random access channel uplink carrier frequency band being different from said time division multiplexed uplink carrier frequency band, said dedicated random access channel uplink carrier frequency band being dedicated to communication of random access channel radiotelephone communications signals.

9. A satellite according to claim 8:

wherein said downlink communicating means comprises:

means for communicating radiotelephone signals to radiotelephones located in a first coverage area; and means for communicating radiotelephone communications signals to radiotelephones located in a second coverage area; and wherein said random access channel signal communicating means comprises:

means for communicating random access channel radiotelephone communications signals from radiotelephones located in said first coverage area over a first dedicated random access channel uplink carrier frequency band; and means for communicating random access channel radiotelephone communications signals from radiotelephones located in said second coverage area over a second dedicated random access channel uplink carrier frequency band different from said first dedicated random access channel uplink carrier frequency band.

10. A satellite according to claim 8 wherein said random access channel signal communicating means comprises:

means for communicating random access channel radiotelephone communications signals from a first radiotelephone over a first dedicated random access channel uplink carrier frequency band; and means for communicating random access channel radiotelephone communications signals from a second radiotelephone over a second dedicated random access channel uplink carrier frequency band different from said first dedicated random access channel uplink carrier frequency band.

11. A satellite according to claim 8 wherein the carrier frequency spectrum includes a plurality of downlink carrier frequency bands and a plurality of uplink carrier frequency bands allocated such that each of the downlink carrier frequency bands is associated with a group of uplink carrier frequency bands:

wherein said downlink communicating means comprises means for communicating radiotelephone communications signals over one of the plurality of downlink carrier frequency bands; and wherein said random access channel signal communicating means comprises means for communicating random access channel radiotelephone communications signals over at least one dedicated random access channel uplink carrier frequency band of the group of uplink carrier frequency bands associated with said one of the plurality of downlink carrier frequency bands.

12. A satellite according to claim 11:

wherein said downlink communicating means comprises means for communicating synchronization radiotelephone communications signals over a synchronization downlink carrier frequency band; and wherein said random access channel communicating means comprises means for communicating random access channel radiotelephone communications signals over at least one dedicated random access channel uplink carrier frequency band of the group of uplink carrier frequency bands associated with said synchronization downlink carrier frequency band.

13. A method of providing a radiotelephone with access to a time division multiple access satellite radiotelephone communications system of the type used to communicate radiotelephone communications signals between at least one satellite and at least one radiotelephone over a carrier frequency spectrum including a plurality of downlink carrier frequency bands and a plurality of uplink carrier frequency bands, the method comprising the steps of:

communicating random access channel radiotelephone communications signals from the radiotelephone to a satellite over a dedicated random access channel uplink carrier frequency band which is dedicated to communication of random access channel radiotelephone communications signals;

assigning a time division multiple access channel on a time-division multiplexed uplink carrier frequency band different from said dedicated random access channel uplink carrier frequency band, in response to the communicated random access channel radiotelephone communications signals;

communicating time division multiplexed radiotelephone communications signals from the radiotelephone to the satellite over the allocated time division multiple access channel on the time division multiplexed uplink carrier frequency band.

14. A method according to claim 13 wherein the satellite communicates radiotelephone communications signals to radiotelephones located in a first coverage area and communicates radiotelephone communications signals to radiotelephones located in a second coverage area, and wherein said step of communicating random access channel radiotelephone communications signals comprises the step of:

communicating random access channel radiotelephone communications signals over a first dedicated random access uplink carrier frequency band if the radiotelephone is located in the first coverage area or communicating random access radiotelephone communications signals over a second dedicated random access channel uplink carrier frequency band different from said first dedicated random access uplink carrier band if the radiotelephone is located in the second coverage area.

15. A method according to claim 13 wherein said step of communicating random access channel radiotelephone communications signals comprises the step of:

communicating random access channel radiotelephone communications signals to the at least one satellite from a first radiotelephone over a first dedicated random access channel uplink carrier frequency band or communicating random access channel radiotelephone communications signals from a second radiotelephone over a second dedicated random access channel uplink carrier frequency band different from said first dedicated random access channel uplink carrier frequency band.

16. A method of accessing a time division multiple access satellite radiotelephone communications system from a radiotelephone, the radiotelephone communications system including at least one satellite and at least one radiotelephone, the method comprising the steps of:

communicating random access channel radiotelephone communications signals from the radiotelephone to a satellite over a dedicated random access channel uplink carrier frequency band which is dedicated to communication of random access channel radiotelephone communications signals; and communicating time division multiplexed radiotelephone communications signals from the radiotelephone to the satellite over a time division multiple access channel on a time division multiplexed uplink carrier frequency band, the time division multiple access channel being allocated in response to the communicated random access channel radiotelephone communications signals.

17. A method according to claim 16 wherein the satellite communicates radiotelephone communications signals to radiotelephones located in a first coverage area and communicates radiotelephone communications signals to radiotelephones located in a second coverage area, and wherein said step of communicating random access channel radiotelephone communications signals comprises the step of:

communicating random access channel radiotelephone communications signals over a first dedicated random access uplink carrier frequency band if the radiotelephone is located in the first coverage area or communicating random access radiotelephone communications signals over a second dedicated random access channel uplink carrier frequency band different from said first dedicated random access uplink carrier band if the radiotelephone is located in the second coverage area.

\* \* \* \* \*